United States Patent
Wilson

(10) Patent No.: US 11,614,316 B1
(45) Date of Patent: Mar. 28, 2023

(54) INJECTION MOLDED HINGED KNOB

(71) Applicant: APEX BRANDS, INC., Apex, NC (US)

(72) Inventor: Cecil McKinley Wilson, Sanford, NC (US)

(73) Assignee: Apex Brands, Inc., Apex, NC (US)

(*) Notice: Subject to any disclaimer, the term of this patent is extended or adjusted under 35 U.S.C. 154(b) by 0 days.

(21) Appl. No.: 17/800,402

(22) PCT Filed: Mar. 3, 2021

(86) PCT No.: PCT/US2021/020645
§ 371 (c)(1),
(2) Date: Aug. 17, 2022

(87) PCT Pub. No.: WO2021/178518
PCT Pub. Date: Sep. 10, 2021

Related U.S. Application Data

(60) Provisional application No. 62/985,146, filed on Mar. 4, 2020.

(51) Int. Cl.
*G01B 3/10* (2020.01)
*G01B 3/1046* (2020.01)
(Continued)

(52) U.S. Cl.
CPC ....... *G01B 3/1046* (2020.01); *B65H 75/4494* (2013.01); *G01B 3/1005* (2013.01);
(Continued)

(58) Field of Classification Search
CPC .............. G01B 3/1005; G01B 3/1046; G01B 2003/1025
(Continued)

(56) References Cited

U.S. PATENT DOCUMENTS 1,812,965 A * 7/1931 Langsner ............. G01B 3/1041
242/398
2,312,943 A * 3/1943 Van Buskirk ........ G01B 3/1041
242/395.1
(Continued)

FOREIGN PATENT DOCUMENTS

EP 0724133 A2 7/1996

OTHER PUBLICATIONS

International Search Report and Written Opinion of International Application No. PCT/US2021/020645 dated May 24, 2021, all pages cited in its entirety.

*Primary Examiner* — George B Bennett
(74) *Attorney, Agent, or Firm* — Burr & Forman, LLP

(57) ABSTRACT

A tape measuring device includes a housing having an aperture, a reel assembly disposed in the housing, a tape having a first end operably coupled to an end hook and configured to extend from the housing through the aperture and having a second end configured to be wound on the reel assembly, and a retraction assembly configured to interface with the reel assembly to enable the tape, after extension from the housing, to be wound onto the reel assembly. The retraction assembly includes a crank operably coupled to the reel assembly to turn the reel assembly responsive to rotation of the crank, and includes a knob operably coupled to the crank via a knob hinge. The knob hinge is rotatable between a closed position for storage or transport and an open position for operation of the retraction assembly, and is configured to be retained in each of the open position and the closed position.

12 Claims, 11 Drawing Sheets

(51) Int. Cl.
*B65H 75/44* (2006.01)
*G01B 3/1005* (2020.01)

(52) U.S. Cl.
CPC .............. *G01B 2003/1025* (2013.01); *G01B 2003/1058* (2013.01)

(58) Field of Classification Search
USPC .................................................. 33/761, 768
See application file for complete search history.

(56) References Cited

U.S. PATENT DOCUMENTS

| | | | | |
|---|---|---|---|---|
| 2,455,819 | A | 12/1948 | Smith | |
| 2,497,471 | A | 2/1950 | Shillman | |
| 2,914,269 | A * | 11/1959 | Freeman | G01B 3/1084 242/405 |
| 3,520,487 | A * | 7/1970 | Quenot | G01B 3/1005 242/395.1 |
| 3,763,569 | A * | 10/1973 | Merlat | G01B 3/1041 D10/71 |
| 3,830,443 | A * | 8/1974 | Quenot | G01B 3/1005 242/395.1 |
| 6,464,160 | B2 * | 10/2002 | Hsu | G01B 3/1005 242/395 |
| 6,698,679 | B1 * | 3/2004 | Critelli | G01B 3/1071 242/395 |
| 7,062,859 | B1 * | 6/2006 | Revnell | B43L 13/20 33/430 |
| 7,415,778 | B1 * | 8/2008 | McEwan | G01B 3/1041 242/395 |
| 7,434,330 | B2 * | 10/2008 | McEwan | G01B 3/1056 33/758 |
| 7,469,482 | B2 * | 12/2008 | Hickey | B44D 3/38 33/1 LE |
| 7,555,843 | B2 * | 7/2009 | Leonard | G01B 3/1041 33/759 |
| 7,568,296 | B2 * | 8/2009 | Huang | G01B 3/1056 33/761 |
| 8,307,513 | B1 | 11/2012 | Fitzgerald | |
| 2008/0010849 | A1 | 1/2008 | Lee | |
| 2009/0151484 | A1 | 6/2009 | Mullen et al. | |

\* cited by examiner

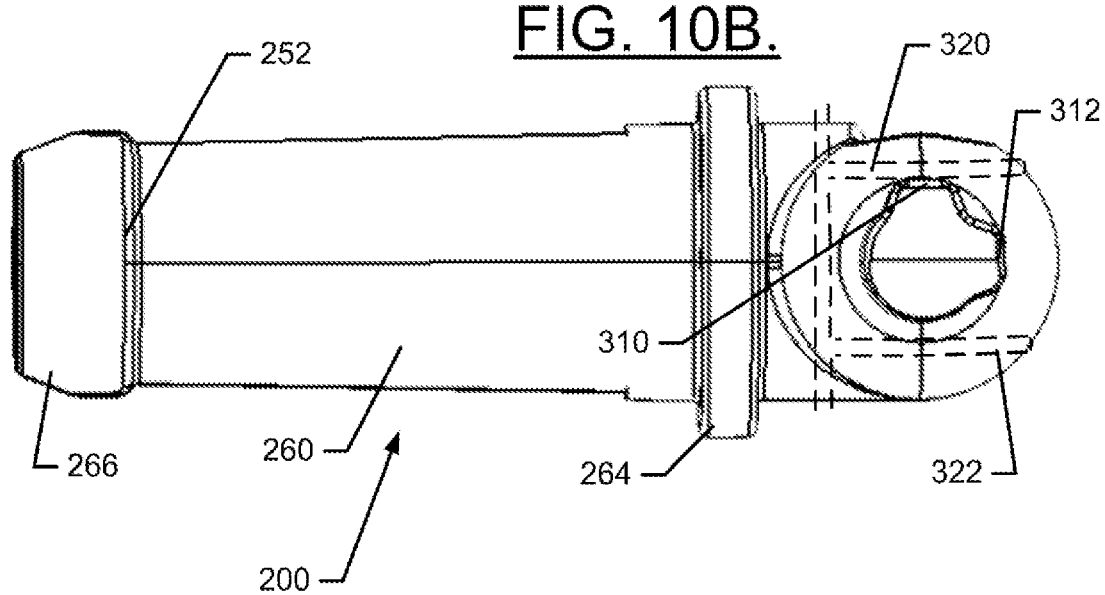
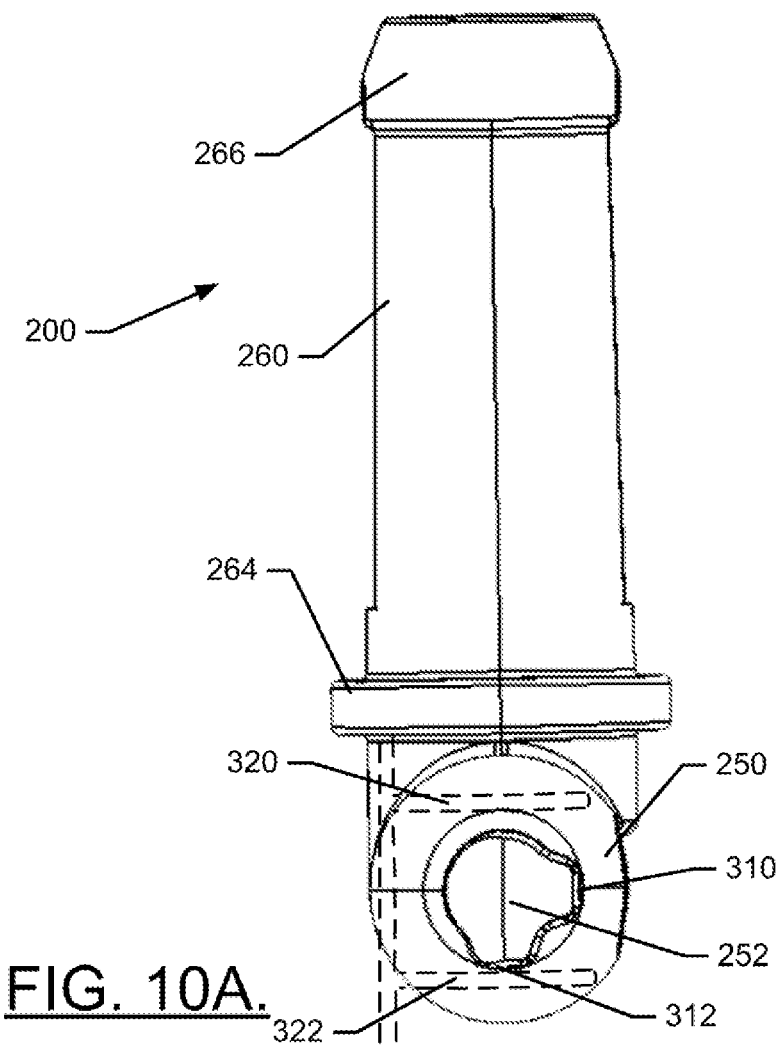

INJECTION MOLDED HINGED KNOB

TECHNICAL FIELD

Example embodiments generally relate to a long tape measuring device, and more particularly relate to such a device having an injection molded hinged knob.

BACKGROUND

Long tape measuring devices typically have lengths so long (e.g., greater than 25 or 50 feet) that a spring-based or other automatic retraction assembly is either not possible or not desirable. Thus, these devices typically have a flexible and flat tape (e.g., made of fiberglass or other materials) that is wound onto a reel or reel assembly. An end hook is affixed to the distal end of the tape, and can be pulled, thereby extracting tape from the reel assembly, to place the end hook at a first point that is distant from a second point near which the remainder of the tool will be retained. Alternatively, the end hook could be affixed to the first point and the remainder of the tool can be moved to the second point while withdrawing tape from the reel assembly. In either case, the end hook retains the tape at the first point, and the user may make measurements, using markings provided on the tape, along a line between the first and second points. After measuring is complete, the user often operates a rotatable handle that is operably coupled to the reel assembly to retract the tape back onto the reel or drum thereof.

The processes described above, and the tools adapted for performing the processes, are both very old. However, equally old in relation to this tool, is the fact that the conventional design for the tool provides a knob mounted on a crank that places the knob away from the axis of rotation of the reel. The knob is configured to rotate from a storage position (or closed position) substantially perpendicular to the axis of rotation of the reel to an in-use position (or open position) where the knob extends substantially parallel to (and spaced apart from) the axis of rotation of the reel. In some cases, the knob may have detents provided on a knob hinge thereof in order to lock the knob in the closed position. However, when the knob is in the open position, the knob is generally free to pivot in an uncontrolled manner between the open position and all positions intermediate to the closed position. This uncontrolled pivoting can both enable the knob to snag on other objects to potentially damage either the objects or the knob. Even if no damage occurs, the uncontrolled pivoting of the knob is generally perceived to lack quality or may be annoying to users.

Brief Summary of Some Examples

Some example embodiments may enable the provision of a long tape measuring device that has an improved design, which enables the knob to be produced with improved ergonomics and performance. Accordingly, the disadvantages discussed above may be overcome.

In an example embodiment, a tape measuring device is provided. The tape measuring device includes a housing having an aperture, a reel assembly disposed in the housing, a tape having a first end operably coupled to an end hook and configured to extend from the housing through the aperture and having a second end configured to be wound on the reel assembly, and a retraction assembly configured to interface with the reel assembly to enable the tape, after extension from the housing, to be wound onto the reel assembly. The retraction assembly includes a crank operably coupled to the reel assembly to turn the reel assembly responsive to rotation of the crank, and includes a knob operably coupled to the crank via a knob hinge. The knob hinge is rotatable between a closed position for storage or transport and an open position for operation of the retraction assembly, and is configured to be retained in each of the open position and the closed position.

In another example embodiment, a retraction assembly for a tape measuring device is provided. The retraction assembly may include a crank operably coupled to a reel assembly enclosed within a housing of the device. The crank may be configured to turn the reel assembly responsive to rotation of the crank to wind tape onto the reel assembly. The retraction assembly may further include a knob hinge operably coupled to the crank, and a knob operably coupled to the knob hinge. The knob hinge and the knob are rotatable between a closed position for storage or transport and an open position for operation of the retraction assembly via rotation of the crank. The knob hinge is configured to be retained in each of the open position and the closed position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 10A and 10B illustrate the knob hinge rotated between the closed and open positions, respectively, in accordance with an example embodiment.

DETAILED DESCRIPTION

Figure 1:
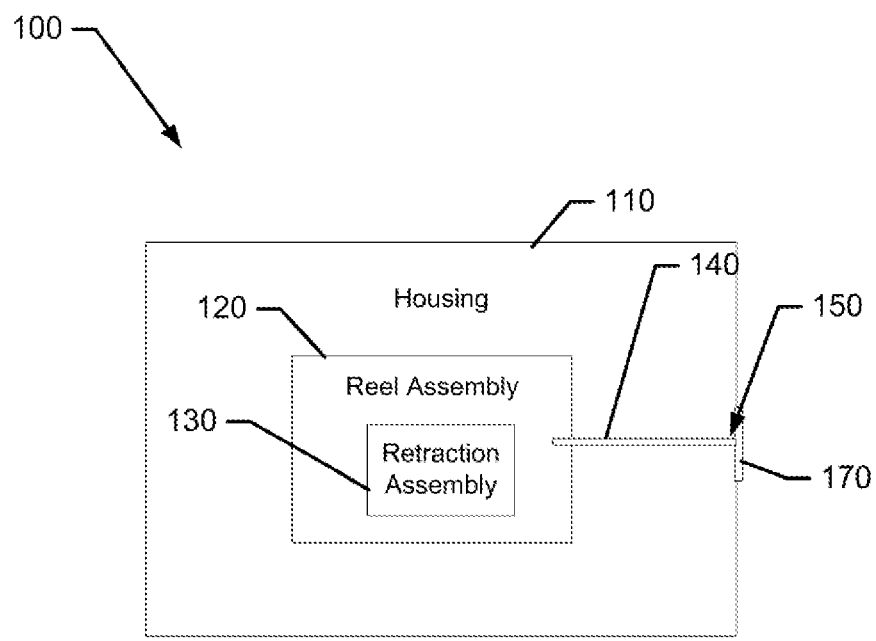
FIG. 1 illustrates a block diagram of a long tape measuring device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure.

Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a long tape measuring device that may have an improved design for the knob (and particularly the knob hinge). This may also, and advantageously, be accomplished using a design that can be injection molded to simplify the design and reduce costs associated therewith. FIG. 1 illustrates a block diagram of a long tape measuring device 100 in accordance with an example embodiment, and FIGS. 2 and 3 illustrate front and rear views, respectively, of the long tape measuring device 100.

Figure 2:
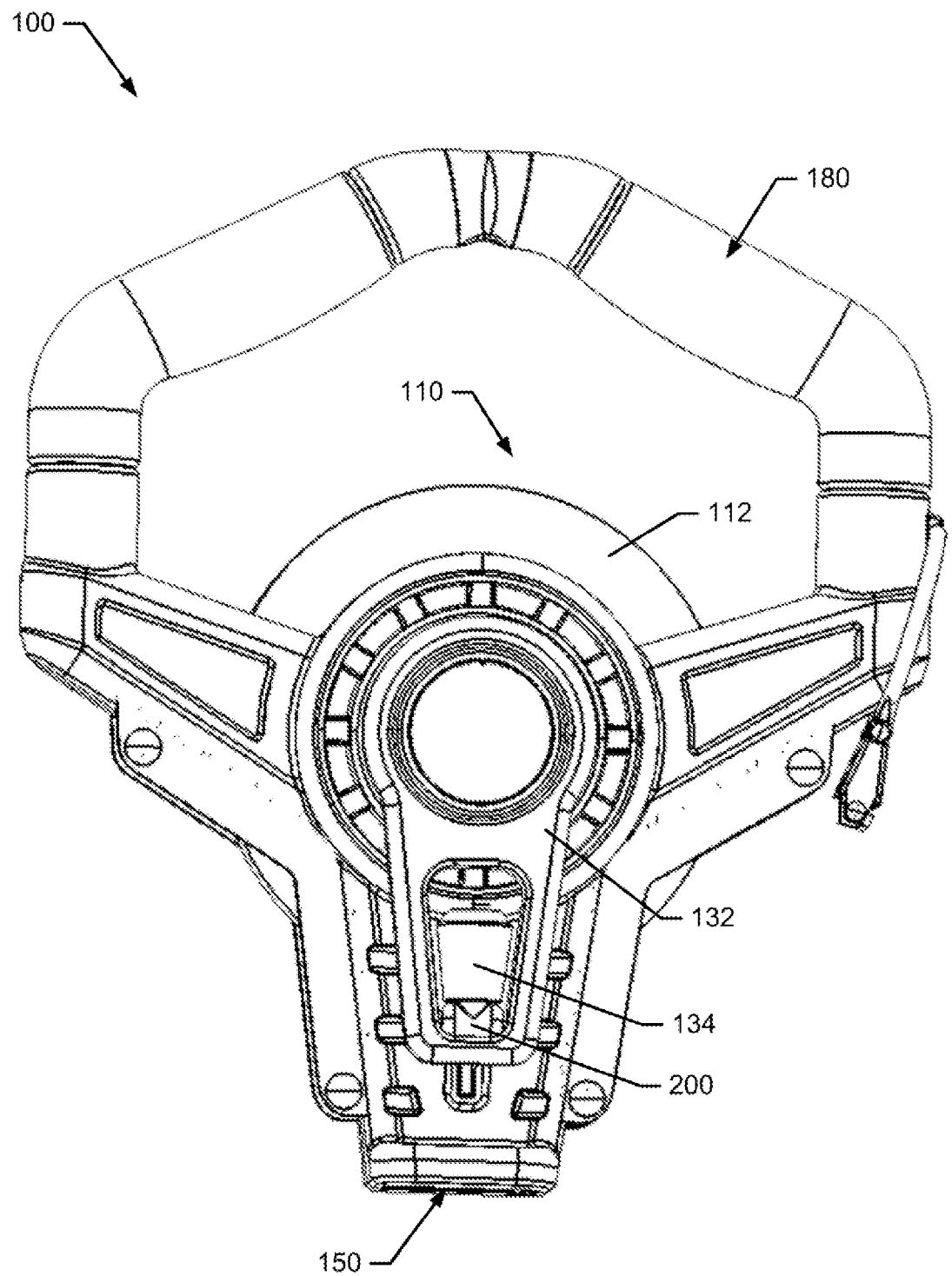
FIG. 2 illustrates a front view of the long tape measuring device in accordance with an example embodiment.
Figure 3:
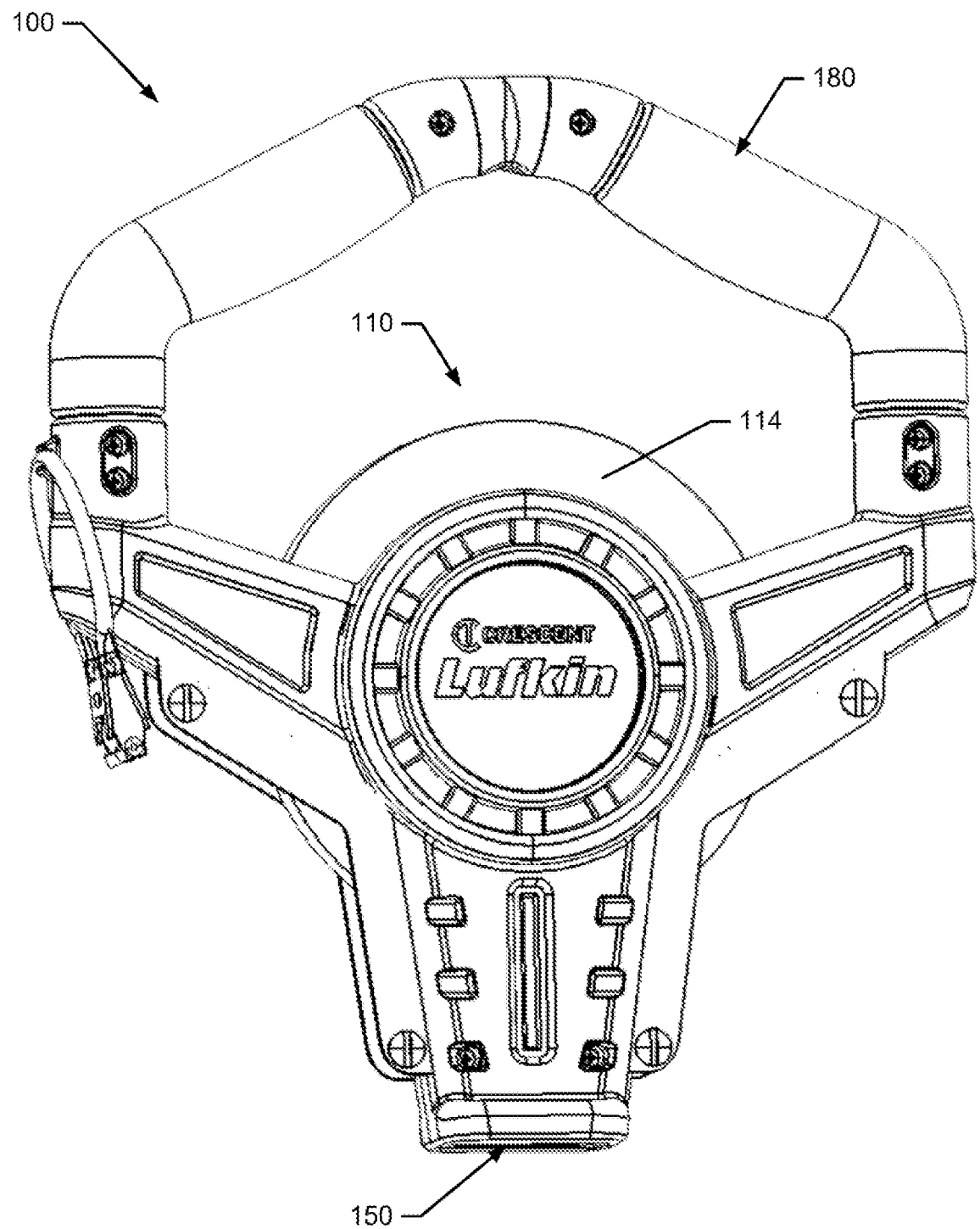
FIG. 3 illustrates a rear view of the long tape measuring device in accordance with an example embodiment.

Referring now to FIGS. 1-3, the long tape measuring device 100 of an example embodiment may include a housing 110 comprising a first case half 112 and a second case half 114. The first and second case halves 112 and 114 may house a reel assembly 120 and a retraction assembly 130 therein. A tape 140 may be wound onto the reel assembly 120 and may be alternately withdrawn from and retracted back onto the reel assembly 120. The retraction back onto the reel assembly 120 may be accomplished via the retraction assembly 130, which may include a crank 132 and a foldable knob 134 that is folded in to nest inside a portion of the crank 132 proximate to the first case half 112, and folded out in order to enable the user to turn the crank 132 about an axis of the reel assembly 120. When the knob 134 is folded out and turned, the reel assembly 120 may be configured to rotate either once for each rotation of the crank 132, or multiple times (dependent upon the configuration of the retraction assembly 130). In this regard, in some cases, the retraction assembly 130 may include a hub that is operably coupled to the crank 132, and that rotates and is operably coupled to a gear assembly that may provide multiple rotations of a drum or reel of the reel assembly 120 for each respective rotation of the knob 134 and the crank 132.

The tape 140 may be paid out through an aperture 150 formed in a portion of the housing 110. The aperture 150 may be formed to be slightly larger than a diameter of the tape 140. The tape 140 may therefore be retained on the reel assembly 120 before passing out the aperture 150. The tape 140 may also include an end hook 170 disposed at one end thereof, and the tape 140 is affixed to the reel assembly 120 at the other end of the tape 140. The end hook 170 may be affixed (temporarily) to an anchor point on a medium or surface that is to be marked. Once the end hook 170 is affixed to the anchor point, the tape 140 may be paid out of the aperture 150 and unwound from the reel assembly 120. When a desired length of the tape 140 has been paid out, the user can make any necessary measurements using the tape 140 as described above. The end hook 170 may then be released from the anchor point, and the crank 132 and knob 134 may be used to operate the retraction assembly 130 to wind the tape 140 back onto the reel assembly 120 by drawing the tape 140 back into the housing 110 via the aperture 150. The long tape measuring device 100 may also include a handle 180, which may be operably coupled to the housing 110 or which may be integrally formed as part of the first and second case halves 112 and 114.

Figure 4:
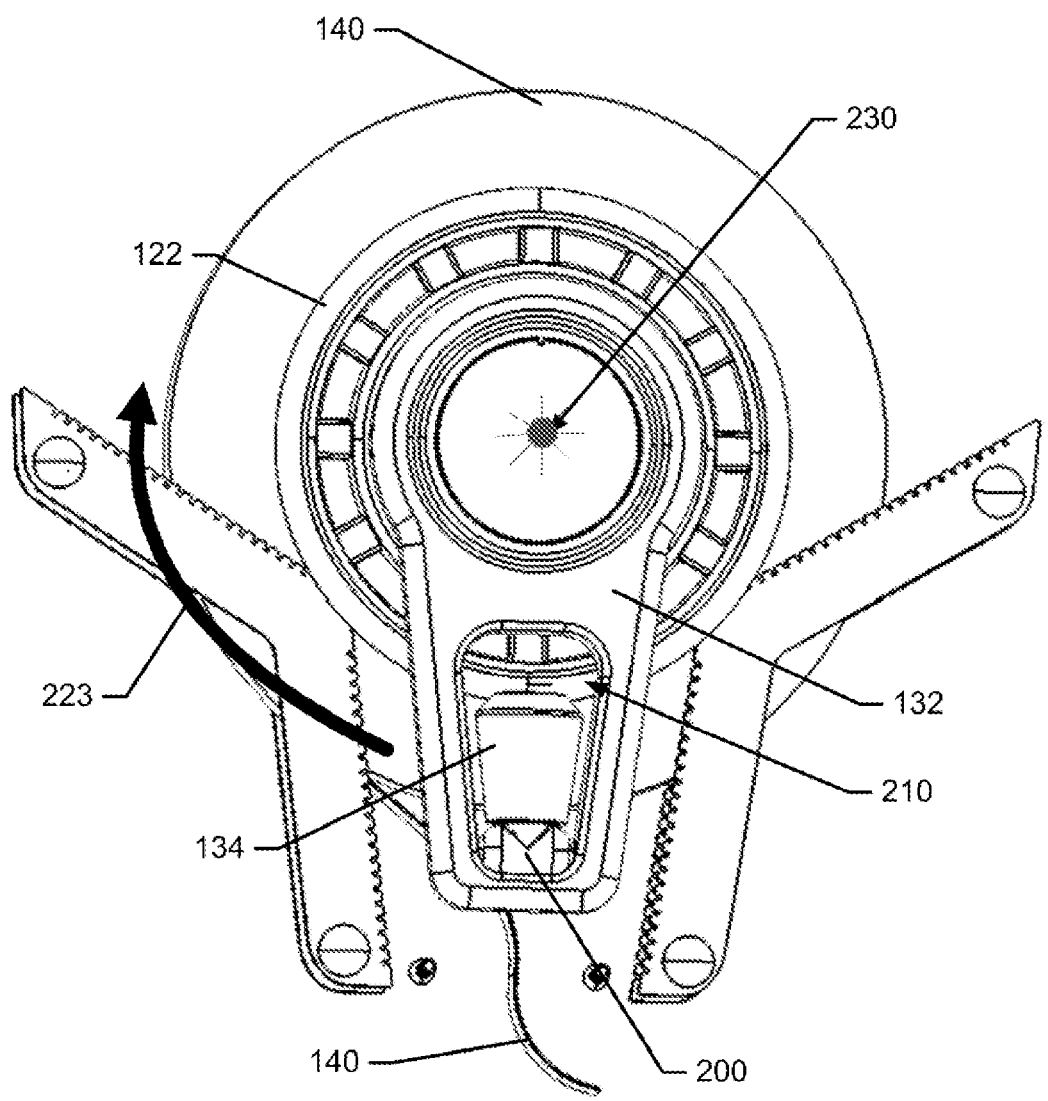
FIG. 4 illustrates a front view of the long tape measuring device with portions of the housing removed in accordance with an example embodiment.
Figure 5:
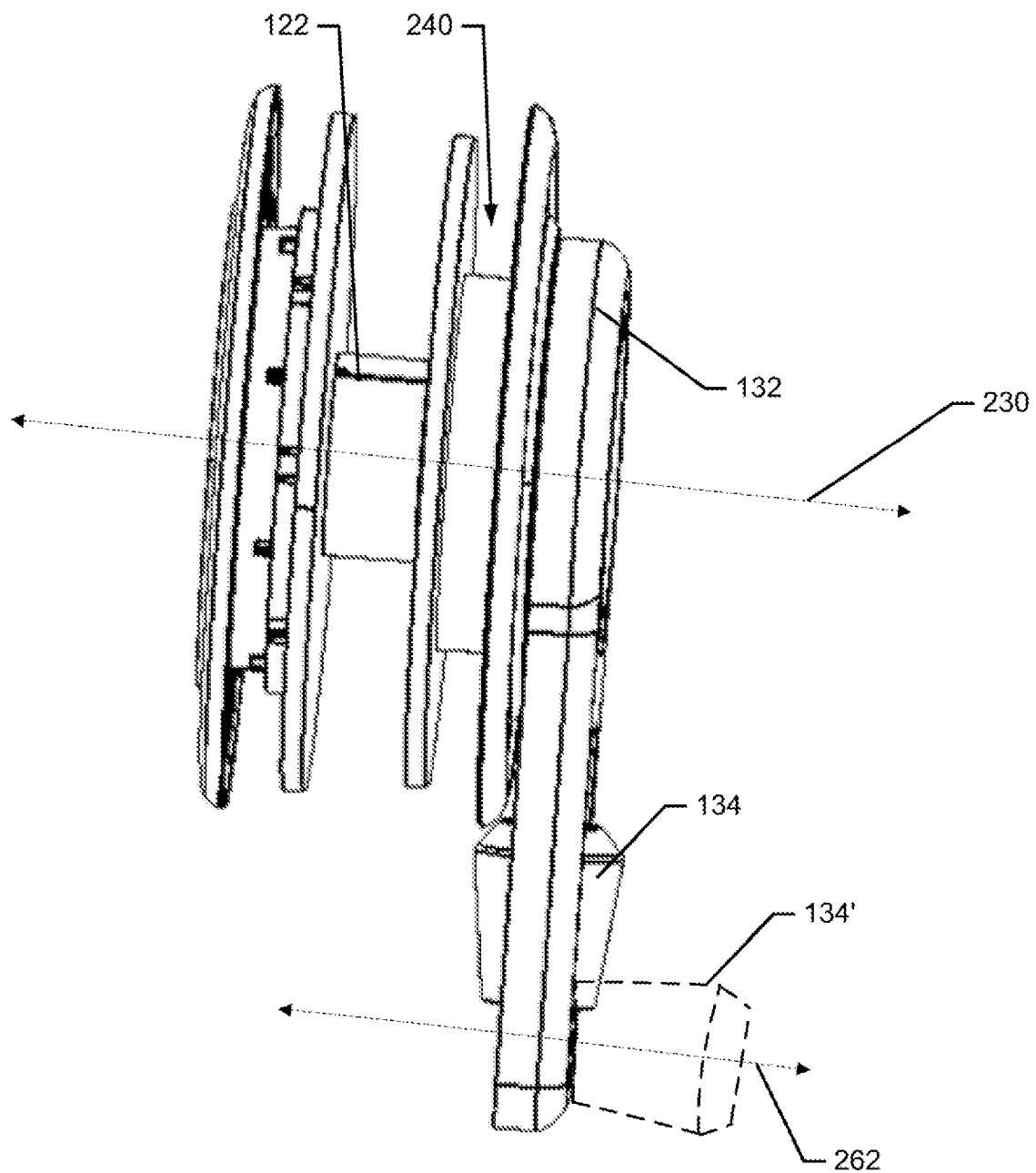
FIG. 5 illustrates a side view of a reel of the reel assembly with the tape removed, and with the crank operably coupled thereto in accordance with an example embodiment.
Figure 6A:
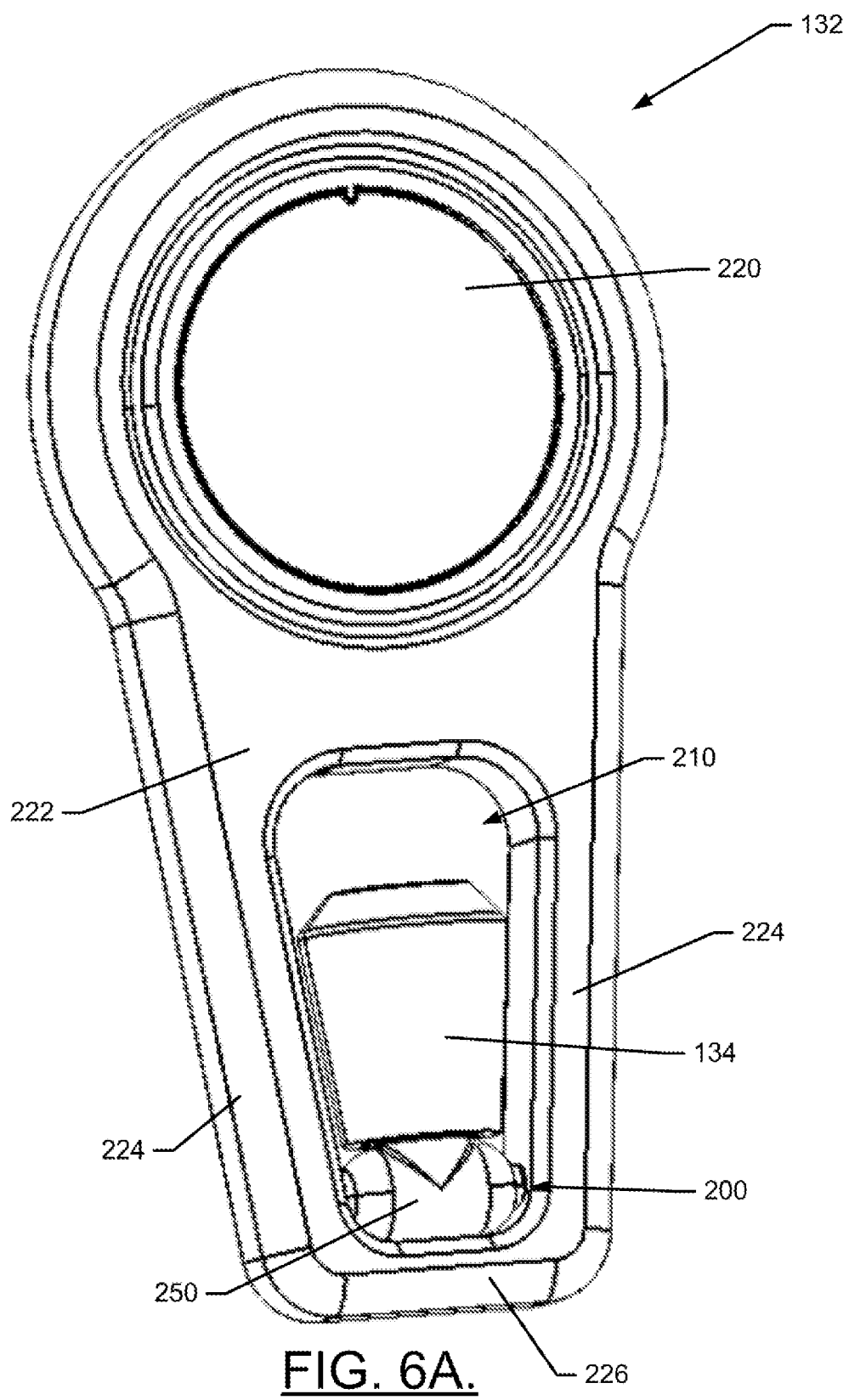
FIG. 6A is an isolated front view of the crank and the knob in accordance with an example embodiment.
Figure 6B:
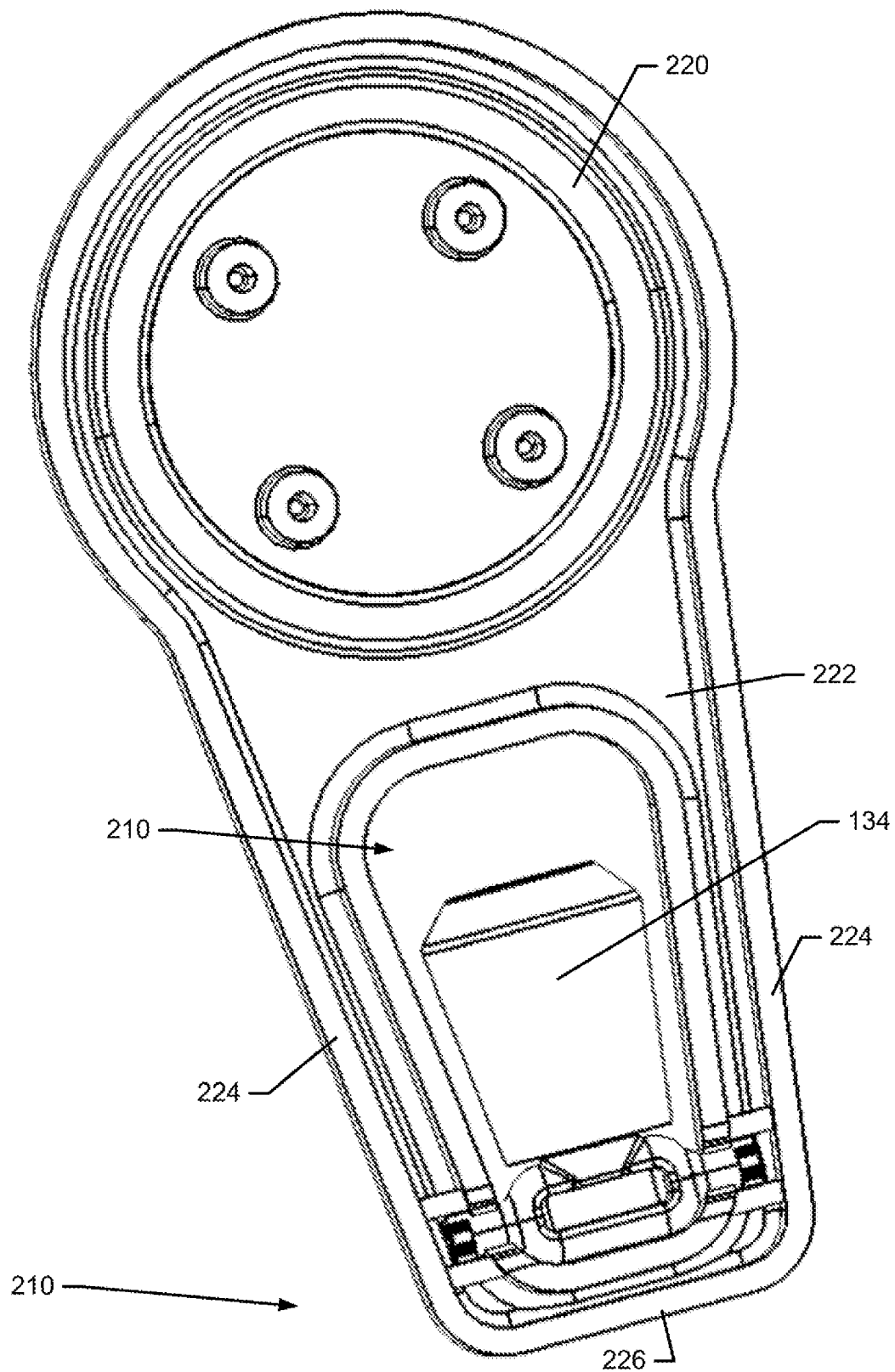
FIG. 6B is an isolated rear view of the crank and the knob in accordance with an example embodiment.
Figure 7:
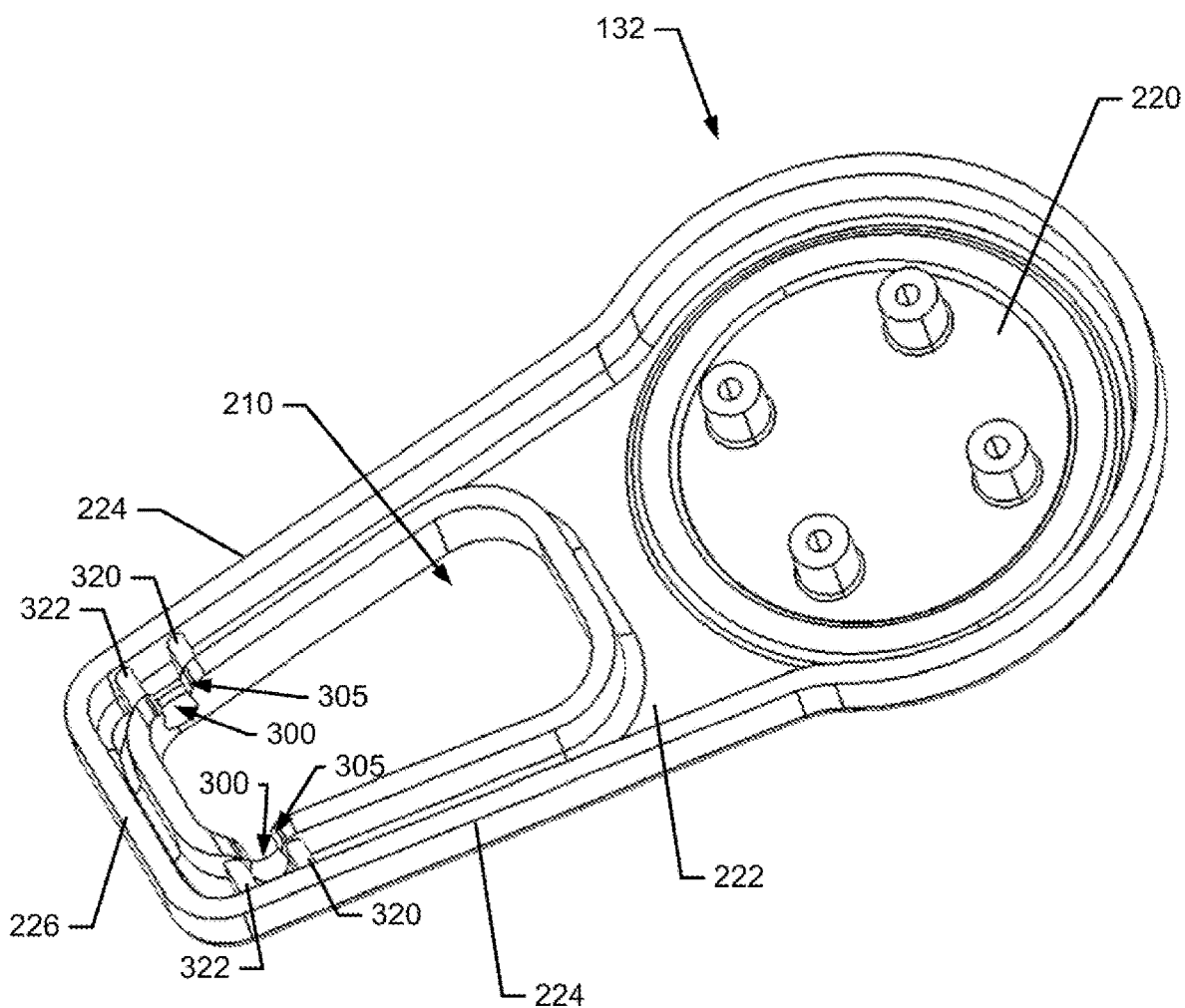
FIG. 7 is a rear perspective view of the crank in isolation (with the knob removed) to show various components thereof that interface with the knob in accordance with an example embodiment.
Figure 8B:
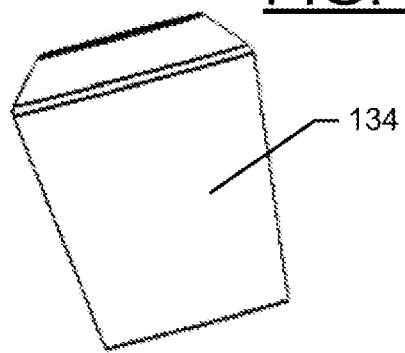
FIG. 8B illustrates the knob after removal from the knob hinge in accordance with an example embodiment.
Figure 8A:
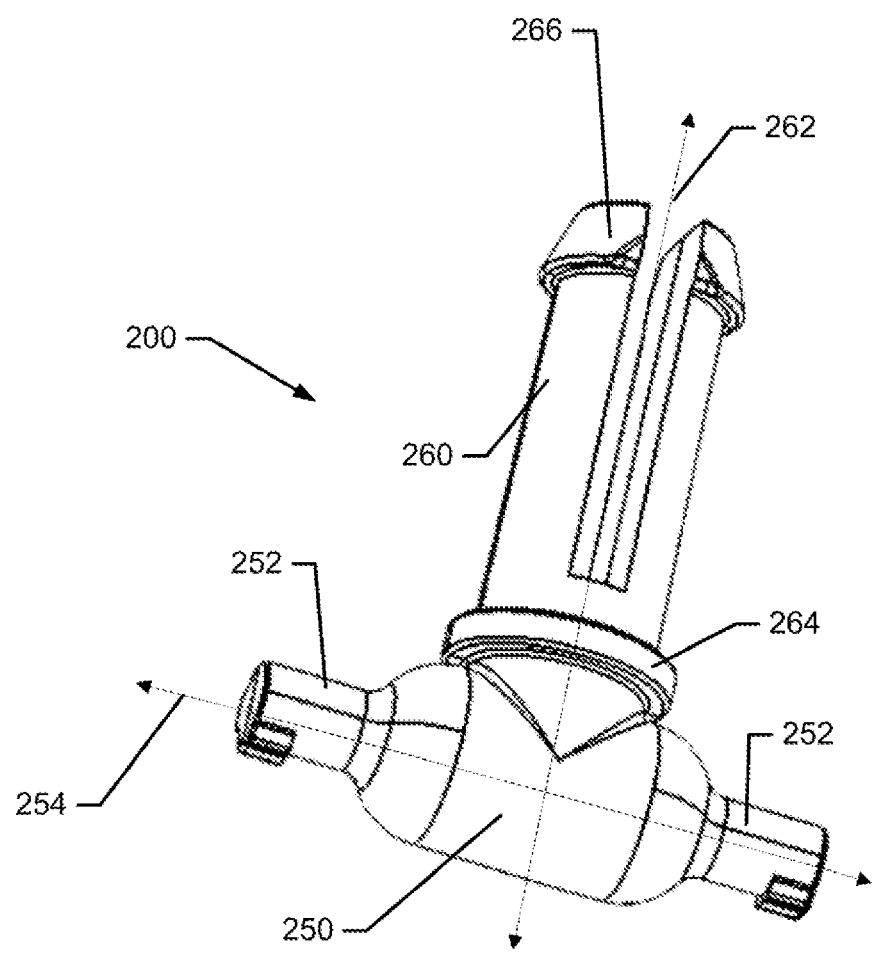
FIG. 8A illustrates the knob hinge with the knob removed in accordance with an example embodiment.
Figure 9A:
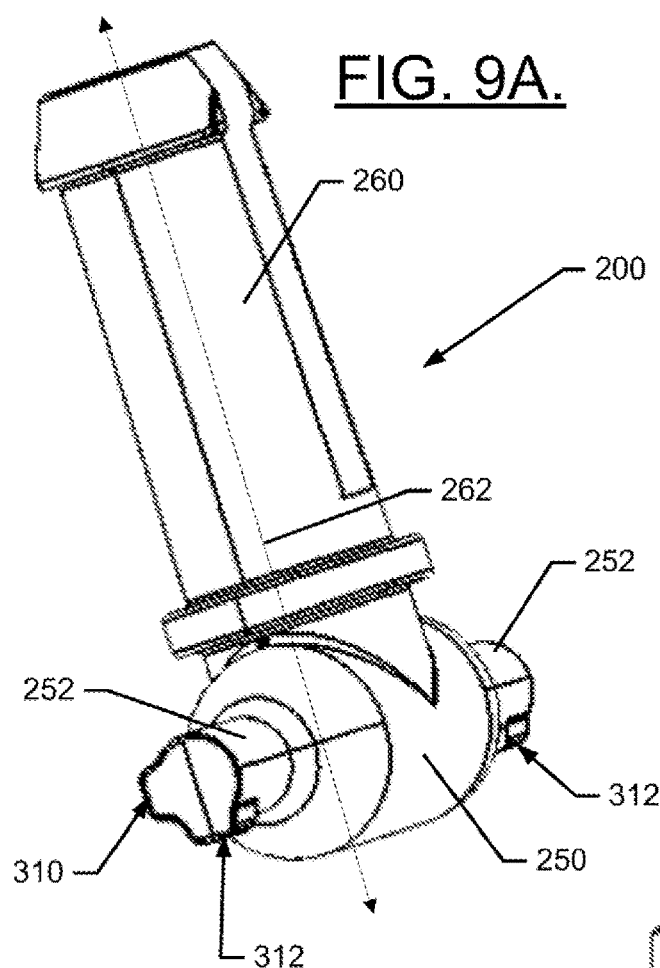
FIG. 9A and FIG. 9B illustrate opposing side, perspective views of the knob hinge in accordance with an example embodiment.
Figure 9B:
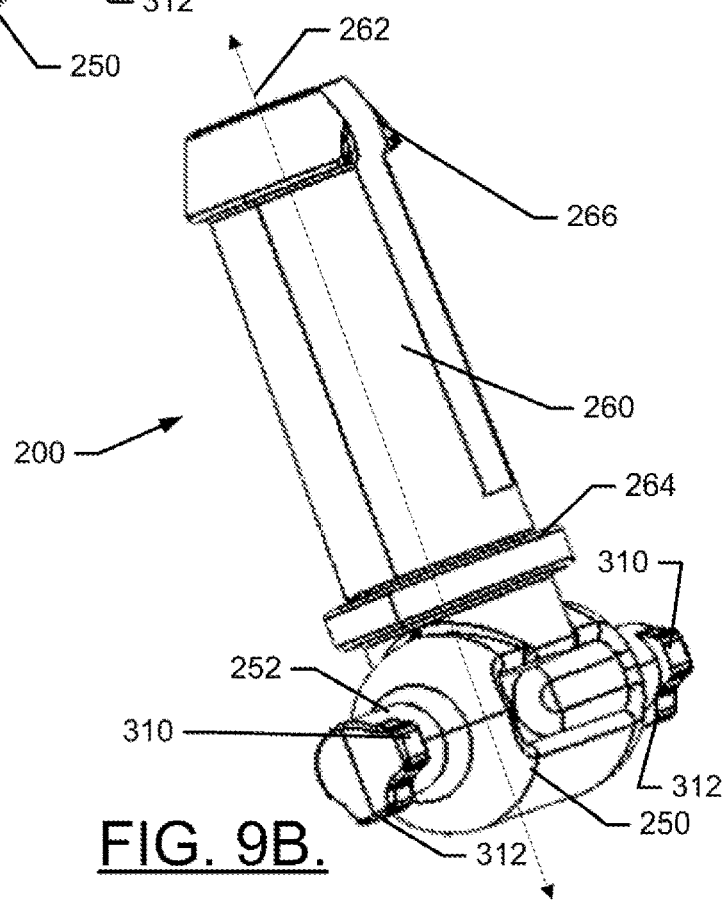

As noted above, the knob 134 may be rotated between a closed position and an open position. The rotation may be enabled based on operation of a knob hinge 200 (see FIG. 2), which may be operably coupled to the crank 132 in a manner described in greater detail below and in reference to FIGS. 4-10. In this regard, FIG. 4 illustrates a front view of the long tape measuring device 100 with portions of the housing 110 removed. FIG. 5 illustrates a side view of a reel 122 of the reel assembly 120 with the tape 140 removed, and with the crank 132 operably coupled thereto. FIG. 6A is an isolated front view of the crank 132 and the knob 134, and FIG. 6B is an isolated rear view of the crank 132 and the knob 134 in accordance with an example embodiment. FIG. 7 is a rear perspective view of the crank 132 in isolation (with the knob 134 removed) to show various components thereof that interface with the knob 134 in accordance with an example embodiment. FIG. 8A illustrates the knob hinge 200 with the knob 134 removed, and FIG. 8B illustrates the knob 134 after removal from the knob hinge 200. FIG. 9A and FIG. 9B illustrate opposing side, perspective views of the knob hinge 200. FIGS. 10A and 10B illustrate the knob hinge 200 rotated between the closed and open positions, respectively.

The knob 134 is positioned on the knob hinge 200, and the knob hinge 200 is rotatable between an open position (see knob 134' in FIG. 5, and FIG. 10B) and a closed position in which the knob 134 is shown in all figures except for the knob 134' of FIG. 5 and FIG. 10B. In the closed position, the knob 134 is retained (as described in greater detail below) or locked by structures that interface with each other on the knob hinge 200 and the crank 132. Meanwhile, in the open position, the knob 134' is also retained (as described in greater detail below) or locked by structures that interface with each other on the knob hinge 200 and the crank 132. Moreover, other positions (e.g., between the open and closed positions) could also be defined for locking the knob 134 relative to the crank 132 using the principles and structures described herein.

When the knob 134 is in the closed position, the knob 134 is generally retained in a receiving orifice 210 formed at a portion of the crank 132. In this regard, the crank 132 may include a hub interface portion 220 and an arm portion 222. The arm portion 222 may extend radially outwardly from the hub interface portion 220 with respect to an axis 230 about which a reel 122 of the reel assembly 120 rotates. The arm portion 222 may be defined by arms 224 that extend outwardly from the hub interface portion 220 to a cross member 226. The receiving orifice 210 may be defined between the cross member 226 and the hub interface portion 220 on longitudinal ends thereof, and between the arms 224 on lateral ends thereof.

The hub interface portion 220 may be somewhat plate shaped, and may be operably coupled to a hub 240 that may in turn be operably coupled to the reel 122 of the reel assembly 120. The axis 230 of the reel 122 may also define the rotational center about which the hub interface portion 220 rotates when the knob 134 is turned by the hand of an operator to turn the crank 132. When rotated in the direction of arrow 223 in FIG. 4, the tape 140 may be wound onto the reel 122.

The knob hinge 200 may include a base 250 having hinge bearings 252 extending outwardly therefrom on opposing longitudinal ends thereof. The base 250 may be substantially cylindrical in shape, but other shapes and perturbations thereof are also possible. The hinge bearings 252 may each also have a substantially cylindrical shape, and the hinge bearings 252 may substantially mirror each other in shape about the base 250. To the extent the base 250 has a cylindrical shape, the base 250 and the hinge bearings 252 may share a hinge axis 254, which may also be a longitudinal axis of the base 250. The knob hinge 200 may pivot about the hinge axis 254 between the open and closed positions.

The knob 134 may be rotatably mounted on a post or stem 260 of the knob hinge 200. The stem 260 may extend away from a center portion of the base 250, and may extend substantially perpendicular to the hinge axis 254. A knob rotation axis 262 about which the knob 134 rotates when mounted on the stem 260 may therefore be understood to rotate from being substantially parallel to the axis 230 of the reel 122 in the open position to being substantially perpendicular to the axis 230 of the reel 122 in the closed position. FIG. 5 shows the knob rotation axis 262 and the axis 230 of the reel 122 being parallel to each other responsive to the knob 134' being in the open position.

The stem 260 may further include an annular flange 264, that may be positioned proximate to the base 250. The stem 260 may also include a snap fitting 266 disposed at a distal end thereof, and the knob 134 may snap onto the stem 260 via engagement with the snap fitting 266, and extend to engage the annular flange 264. The annular flange 264 may serve as a bearing surface for the knob 134. The annular flange 264 may also facilitate transitioning from a relatively large knob 134 to a relatively smaller base of the stem 260 to accommodate aesthetic design preferences. Moreover, different sizes of the knob 134 could be interchangeably mated with the stem 260 depending on design preferences. The annular flange 264 also divides the stem 260 into two portions including a hidden portion located inside the knob 134 and an exposed portion located below the knob 134 and proximate to the base 250, and these portions can have different sizes.

As discussed above, one of the disadvantages of conventional designs is that the knob of such designs is only lockable, at most, in one position. The knob hinge 200 is designed to enable the knob 134 to be locked or otherwise retained in multiple positions (including at least in the closed position and the open position). In order to facilitate this capability, the knob hinge 200 and the crank 132 may include a locking interface. The locking interface may be disposed proximate to a bearing retainer 300 formed in each of the arms 224 of the crank 132. In this regard, as shown in FIGS. 6B and 7, the bearing retainer 300 on each side of the crank 132 may be formed at a distal end of the arms 224 (e.g., proximate to the cross member 226). The bearing retainer 300 may include or be defined as a slot that is sized to fit and retain a corresponding one of the hinge bearings 252 of the knob hinge 200. As such, the bearing retainers 300 may each include a set of retaining shoulders 305 that are disposed to face each other at an entrance of the bearing retainers 300 and have a distance therebetween that is slightly less than a diameter of the hinge bearings 252. Thus, responsive to applying pressure to the hinge bearings 252 to force the retaining shoulders 305 temporarily apart from each other, the hinge bearings 252 may slide into respective ones of the bearing retainers 300 and be retained therein by the retaining shoulders 305.

Once installed into the bearing retainers 300, the hinge bearings 252 may be retained in the bearing retainers 300 by the retaining shoulders 305, but may otherwise be able to rotate in contact with surfaces of the bearing retainers 300 except to the extent that such rotation is inhibited by the locking interface. The locking interface may be defined by hinge detents (e.g., first hinge detents 310 and second hinge detents 312) formed on distal ends of the hinge bearings 252, and by locking ribs (e.g., a first locking rib 320 and a second locking rib 322) disposed in pairs in the arms 224 proximate (and located outwardly with respect to) the bearing retainers 300.

Each pair of the first and second locking ribs 320 and 322 may be disposed to face each other (and be substantially parallel to each other) outside of their respective bearing retainer 300. Moreover, when the hinge bearings 252 are snapped into place in the bearing retainers 300, the hinge axis 254 may pass in between the first and second locking ribs 320 and 322 parallel thereto, and substantially equidistant from each of the first and second locking ribs 320 and 322. The first and second locking ribs 320 and 322 may have a space defined therebetween that is larger than the distance between the retaining shoulders 305.

The first and second hinge detents 310 and 312 may be positioned at respective distal ends of the hinge bearings 252 at a portion of the hinge bearings 252 that lie between the first and second locking ribs 320 and 322. Moreover, in each of the open and closed positions, one of the hinge detents may engage (and lock) with a corresponding one of the locking ribs. As such, in this example, the first and second hinge detents 310 and 312 may be offset from each other relative to the hinge axis 254 by about 90 degrees. However, more generally, the first and second hinge detents 310 and 312 may be offset from each other relative to the hinge axis 254 by an angle that is substantially equal to the angular distance traveled when the knob 134 is rotated from the open position to the closed position (or vice versa).

The first and second hinge detents 310 and 312 may each be defined by a surface that extends tangential to a radius defined from the hinge axis 254 to the corresponding one of the first and second hinge detents 310 and 312. In an example embodiment, the surface defining the first hinge detent 310 may extend substantially parallel to the knob rotation axis 262. Meanwhile, the surface defining the second hinge detent 312 may extend substantially perpendicular to the knob rotation axis 262. A length of the radius (and therefore a distance between the hinge axis 254 and the surfaces defining the first and second hinge detents 310 and 312) may be substantially equal to the distance between the hinge axis 254 and the first and second locking ribs 320 and 322. Accordingly, when the knob hinge 200 is rotated to a position at which one of the locking ribs engages one of the hinge detents, rotation of the knob hinge 200 about the hinge axis 254 may be inhibited (and the knob hinge 200 may be locked). However, when the knob hinge 200 is not in a position where the none of the locking ribs engages any of the hinge detents, rotation of the knob hinge 200 about the hinge axis 254 may be relatively uninhibited (and the knob hinge 200 may be unlocked).

More specifically, when the knob 134 is in the closed position (and the knob rotation axis 262 is substantially perpendicular to the axis 230 of the reel 122) as shown in FIG. 10A, the second hinge detent 312 (on each of the hinge bearings 252) will engage a corresponding one of the second locking ribs 322. This engagement may tend to retain the knob 134 and the knob hinge 200 in the closed position. However, the second locking ribs 322 may have some amount of give or bendability, so that if the user applies a force to rotate the knob hinge 200 to the open position (so that knob rotation axis 262 is substantially parallel to the axis 230 of the reel 122 (as shown by knob 134' in FIG. 5)), the knob hinge 200 may be enabled to move out of the closed position toward the open position.

When the knob hinge 200 approaches the open position, the first hinge detent 310 (on each of the hinge bearings 252)

may begin to engage with a corresponding one of the first locking ribs 320. This engagement will again tend to resist rotation of the knob hinge 200, and the operator may overcome the resistance to place the knob hinge 200 in the open position (as shown in FIG. 10B—and as shown by knob 134' in FIG. 5). When in the open position, the interface between the first hinge detent 310 and the first locking rib 320 will tend to retain the knob hinge 200 in the opened position. The first locking rib 320 may have similar play or give to allow the operator to manually overcome the resistance created between the first locking ribs 320 and first hinge detents 310 to allow unlocking and locking of the knob hinge 200 from and into the open position.

As can be appreciated from the descriptions above, the operator may overcome the resistances created at the open and closed positions to allow repositioning and subsequent locking at the opposing position. Movement in between the open and closed positions may otherwise be substantially uninhibited. In some cases, all of the parts of the housing 110, the reel assembly 120 and/or the retraction assembly 130 may be made by injection molding. This enables low cost and improved manufacturability.

In an example embodiment, a retraction assembly for a tape measuring device (or the measuring tape device itself) may be provided. The retraction assembly may include a crank operably coupled to a reel assembly enclosed within a housing of the device. The crank may be configured to turn the reel assembly responsive to rotation of the crank to wind tape onto the reel assembly. The retraction assembly may further include a knob hinge operably coupled to the crank, and a knob operably coupled to the knob hinge. The knob hinge and the knob are rotatable between a closed position for storage or transport and an open position for operation of the retraction assembly via rotation of the crank. The knob hinge is configured to be retained in each of the open position and the closed position.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the knob hinge may include a base having a longitudinal centerline aligned with a hinge axis about which the knob hinge rotates between the open and closed position, the knob hinge may include hinge bearings extending from opposing ends of base along the hinge axis, and the knob hinge and the crank may each include structures forming a locking interface configured to retain the knob hinge in each of the open position and the closed position. In an example embodiment, the crank may include bearing retainers disposed to face each other opposite a receiving orifice formed in the crank. The bearing retainers may be configured to rotatably receive the hinge bearings therein, and the locking interface may be disposed outwardly from each of the bearing retainers with respect to the base. In some cases, the locking interface may include hinge detents disposed proximate to distal ends of the hinge bearings, and locking ribs disposed proximate to the bearing retainers. In an example embodiment, the hinge detents may include a first hinge detent and a second hinge detent offset from each other about the hinge axis by an angle substantially equal to an angular distance the knob hinge rotates between the open and closed positions. In some cases, the locking ribs may include a first locking rib configured to engage the first hinge detent in the open position, and a second locking rib configured to engage the second hinge detent in the closed position. In an example embodiment, the first and second hinge detents may be defined by surfaces spaced apart from the hinge axis by a distance substantially equal to a distance from the hinge axis to the first and second locking ribs. In some cases, the angle by which the first and second hinge detents may be offset is about 90 degrees. In an example embodiment, the knob may be rotatably attached to a stem of the knob hinge, and the stem of the knob hinge may extend away from the base perpendicular to the hinge axis. The stem may also include an annular flange, and the annular flange may be configured to operate as a bearing surface for the knob. In some cases, the annular flange may divide the stem into two portions including a hidden portion located inside the knob and an exposed portion located below the knob and proximate to the base.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A tape measuring device comprising:
   a housing having an aperture;
   a reel assembly disposed in the housing;
   a tape having a first end operably coupled to an end hook and configured to extend from the housing through the aperture and having a second end configured to be wound on the reel assembly; and
   a retraction assembly configured to interface with the reel assembly to enable the tape, after extension from the housing to be wound onto the reel assembly,
   wherein the retraction assembly comprises a crank operably coupled to the reel assembly to turn the reel assembly responsive to rotation of the crank,
   wherein the retraction assembly comprises a knob operably coupled to the crank via a knob hinge, the knob hinge being rotatable between a closed position for storage or transport and an open position for operation of the retraction assembly, and wherein the knob hinge is configured to be retained in each of the open position and the closed position, wherein the knob hinge comprises a base having a longitudinal centerline aligned with a hinge axis about which the knob hinge rotates between the open and closed position, wherein the knob hinge comprises hinge bearings extending from opposing ends of base along the hinge axis, wherein the knob hinge and the crank each comprise structures forming a locking interface configured to retain the knob hinge in each of the open position and the closed position, wherein the crank includes bearing retainers disposed to face each other opposite a receiving orifice formed in the crank, wherein the bearing retainers are configured to rotatably receive the hinge bearings therein, and wherein the locking interface is disposed outwardly from each of the bearing retainers with respect to the base.

2. The tape measuring device of claim 1, wherein the locking interface comprises hinge detents disposed proximate to distal ends of the hinge bearings, and locking ribs disposed proximate to the bearing retainers.

3. The tape measuring device of claim 2, wherein the hinge detents include a first hinge detent and a second hinge detent offset from each other about the hinge axis by an angle substantially equal to an angular distance the knob hinge rotates between the open and closed positions.

4. The tape measuring device of claim 3, wherein the locking ribs include a first locking rib configured to engage the first hinge detent in the open position, and a second locking rib configured to engage the second hinge detent in the closed position.

5. The tape measuring device of claim 4, wherein the first and second hinge detents are defined by surfaces spaced apart from the hinge axis by a distance substantially equal to a distance from the hinge axis to the first and second locking ribs.

6. The tape measuring device of claim 2, wherein the angle by which the first and second hinge detents are offset is about 90 degrees.

7. A retraction assembly for a tape measuring device, the retraction assembly comprising:

a crank operably coupled to a reel assembly enclosed within a housing of the device, the crank being configured to turn the reel assembly responsive to rotation of the crank to wind tape onto the reel assembly;

a knob hinge operably coupled to the crank; and a knob operably coupled to the knob hinge, wherein the knob hinge and the knob are rotatable between a closed position for storage or transport and an open position for operation of the retraction assembly via rotation of the crank, wherein the knob hinge is configured to be retained in each of the open position and the closed position, wherein the knob hinge comprises a base having a longitudinal centerline aligned with a hinge axis about which the knob hinge rotates between the open and closed position, wherein the knob hinge comprises hinge bearings extending from opposing ends of base along the hinge axis, wherein the knob hinge and the crank each comprise structures forming a locking interface configured to retain the knob hinge in each of the open position and the closed position, wherein the crank includes bearing retainers disposed to face each other opposite a receiving orifice formed in the crank, wherein the bearing retainers are configured to rotatably receive the hinge bearings therein, and wherein the locking interface is disposed outwardly from each of the bearing retainers with respect to the base.

8. The retraction assembly of claim 7, wherein the locking interface comprises hinge detents disposed proximate to distal ends of the hinge bearings, and locking ribs disposed proximate to the bearing retainers.

9. The retraction assembly of claim 8, wherein the hinge detents include a first hinge detent and a second hinge detent offset from each other about the hinge axis by an angle substantially equal to an angular distance the knob hinge rotates between the open and closed positions.

10. The retraction assembly of claim 9, wherein the locking ribs include a first locking rib configured to engage the first hinge detent in the open position, and a second locking rib configured to engage the second hinge detent in the closed position.

11. The retraction assembly of claim 10, wherein the first and second hinge detents are defined by surfaces spaced apart from the hinge axis by a distance substantially equal to a distance from the hinge axis to the first and second locking ribs.

12. The retraction assembly of claim 8, wherein the angle by which the first and second hinge detents are offset is about 90 degrees.

* * * * *